United States Patent
Li (10) Patent No.: US 10,763,752 B1
(45) Date of Patent: Sep. 1, 2020

(54) ZERO-VOLTAGE-SWITCHING FLYBACK CONVERTER

(71) Applicant: Monolithic Power Systems, Inc., San Jose, CA (US)

(72) Inventor: Yancun Li, San Jose, CA (US)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 16/452,453

(22) Filed: Jun. 25, 2019

(51) Int. Cl.
*H02M 3/335* (2006.01)
*H02M 1/00* (2006.01)

(52) U.S. Cl.
CPC ... *H02M 3/33507* (2013.01); *H02M 3/33569* (2013.01); *H02M 2001/0022* (2013.01); *H02M 2001/0058* (2013.01)

(58) Field of Classification Search
CPC ............. H02M 3/335; H02M 3/33507; H02M 3/33515; H02M 3/33523; H02M 3/33561; H02M 3/33569; H02M 3/33592; H02M 2001/0022; H02M 2001/0058; H02M 2001/0032; H02M 1/32; Y02B 70/1441; Y02B 70/1443; Y02B 70/1475
USPC ........................................... 363/21.01–21.18
See application file for complete search history.

(56) References Cited

U.S. PATENT DOCUMENTS

| | | | | |
|---|---|---|---|---|
| 6,373,726 B1* | 4/2002 | Russell | ............. | H02M 3/33507 363/127 |
| 7,046,525 B2* | 5/2006 | Smidt | ............... | H02M 3/33576 363/16 |
| 8,054,655 B2* | 11/2011 | Moyer | ............... | H02M 3/33592 363/21.13 |
| 8,363,431 B2* | 1/2013 | Lin | ............. | G06F 1/04 363/21.18 |
| 8,498,135 B2* | 7/2013 | Li | ............. | H02M 3/33507 363/21.05 |
| 8,891,258 B2* | 11/2014 | Zhang | ............... | H02M 3/33507 363/21.12 |
| 8,952,632 B2* | 2/2015 | Du | ............. | H05B 33/0848 315/291 |
| 9,673,718 B2* | 6/2017 | Fahlenkamp | ..... | H02M 3/33523 |
| 10,187,934 B2* | 1/2019 | Melanson | ............... | H05B 45/14 |
| 2013/0155728 A1* | 6/2013 | Melanson | ............... | H02M 1/44 363/21.16 |
| 2014/0028095 A1* | 1/2014 | Maru | ................. | H02M 3/33523 307/31 |
| 2017/0251535 A1* | 8/2017 | Huang | ............... | H05B 45/3725 |

* cited by examiner

*Primary Examiner* — Yemane Mehari
(74) *Attorney, Agent, or Firm* — Perkins Coie LLP (57) ABSTRACT

A method of controlling a flyback circuit and control circuit thereof. The flyback circuit has a transformer having a primary winding and an auxiliary winding, and the primary winding and the auxiliary winding have opposite dot orientations with each other. During a switching cycle, a primary switch coupled to the primary winding is turned off; then, an auxiliary switch coupled to the auxiliary winding is turned on when, after an elapse of a predetermined waiting time counted from a predetermined moment in an immediate preceding switching cycle, an auxiliary switch voltage signal decreases to a valley of the auxiliary switch voltage signal. The auxiliary switch is turned off when the auxiliary switch current signal increases to a reference current. The primary switch is turned on when a primary switch voltage signal decreases to a valley of the primary switch voltage signal.

20 Claims, 9 Drawing Sheets

ZERO-VOLTAGE-SWITCHING FLYBACK CONVERTER

TECHNICAL FIELD

The present invention generally relates to electrical circuits, and more particularly but not exclusively relates to flyback circuits.

BACKGROUND

In flyback converters, high power density and high efficiency may be achieved by employing zero-voltage switching (ZVS) techniques. One of the ZVS techniques, for example, is to discharge an output capacitor of a primary power switch before the primary power switch is turned on by a control signal, thus switching-on loss of the primary power switch is eliminated, and the efficiency is then improved. However, the conventional implementation of ZVS techniques may require a relatively complicated circuit structure and raise an issue of high cost. Accordingly, a simple solution of ZVS for flyback converters is needed.

SUMMARY

There has been provided, in accordance with an embodiment of the present invention, a method of controlling a flyback circuit during a switching cycle, wherein the flyback circuit has a transformer having a primary winding and an auxiliary winding, the primary winding and the auxiliary winding have opposite dot orientations with each other, the method comprising: turning off a primary switch coupled to the primary winding; turning on an auxiliary switch coupled to the auxiliary winding when, after an elapse of a predetermined waiting time counted from a predetermined moment in an immediate preceding switching cycle, an auxiliary switch voltage signal decreases to a valley of the auxiliary switch voltage signal; turning off the auxiliary switch when the auxiliary switch current signal increases to a current level of a reference current; and turning on the primary switch when a primary switch voltage signal decreases to a valley of the primary switch voltage signal.

There has been provided, in accordance with an embodiment of the present invention, a control circuit for a flyback circuit, wherein the flyback circuit has a transformer having a primary winding and an auxiliary winding, and a primary switch coupled to the primary winding, the primary winding and the auxiliary winding having opposite dot orientations with each other, the control circuit comprising: an auxiliary switch, coupled to the auxiliary winding; a first control unit, configured to provide a first control signal to control turning-on of the auxiliary switch, wherein, the auxiliary switch is turned on when, after an elapse of a predetermined waiting time counted from a predetermined moment in an immediate switching cycle, an auxiliary switch voltage signal decreases to a valley of the auxiliary switch voltage signal; a second control unit, configured to provide a second control signal to control turning-off of the auxiliary switch, wherein the auxiliary switch is turned off when the auxiliary switch current signal increases to a reference current; a third control unit, configured to provide a third control signal to control turning-on of the primary switch, wherein the primary switch is turned on when a primary switch voltage signal decreases to a valley of the primary switch voltage signal; and a logic circuit, configured to provide a primary switching signal based on the third control signal and a fourth control signal and an auxiliary switching signal based on the first control signal and the second control signal, wherein the primary switch is controlled by the primary switching signal, and the auxiliary switch is controlled by the auxiliary switching signal.

There has been provided, in accordance with an embodiment of the present invention, an isolation voltage converter, comprising: a flyback circuit, comprising a transformer having a primary winding and an auxiliary winding, and a primary switch coupled to the primary winding, wherein the primary winding and the auxiliary winding have opposite dot orientations with each other; and a control circuit, comprising: an auxiliary switch, coupled to the auxiliary winding; a first control unit, configured to provide a first control signal to control turning-on of the auxiliary switch, wherein, the auxiliary switch is turned on when, after an elapse of a predetermined waiting time counted from a predetermined moment in an immediate preceding switching cycle, an auxiliary switch voltage signal decreases to a valley of the auxiliary switch voltage signal; a second control unit, configured to provide a second control signal to control turning-off of the auxiliary switch, wherein the auxiliary switch is turned off when the auxiliary switch current signal increases to a reference current; a third control unit, configured to provide a third control signal to control turning-on of the primary switch, wherein the primary switch is turned on when a primary switch voltage signal decreases to a valley of the primary switch voltage signal; and a logic circuit, configured to provide a primary switching signal based on the third control signal and a fourth control signal and an auxiliary switching signal based on the first control signal and the second control signal, wherein the primary switch is controlled by the primary switching signal, and the auxiliary switch is controlled by the auxiliary switching signal.

BRIEF DESCRIPTION OF THE DRAWINGS

The present invention can be further understood with reference to the following detailed description and the appended drawings, wherein like elements are provided with like reference numerals. The drawings are only for illustration purpose. They may only show part of the devices and are not necessarily drawn to scale.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1A:
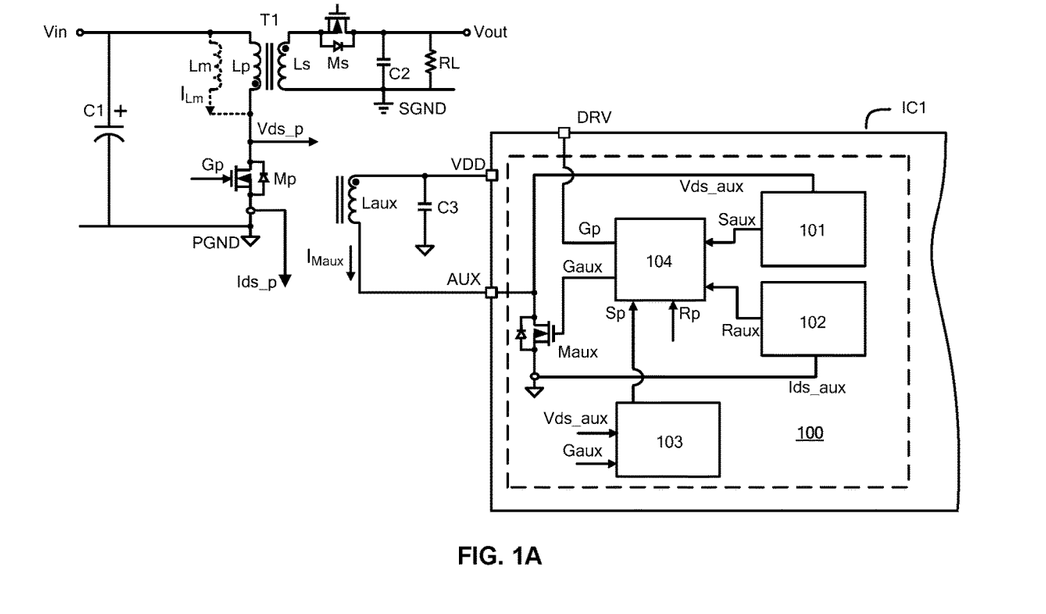
FIG. 1A illustrate a control circuit 100 for a flyback circuit in accordance with an embodiment of the present invention.

FIG. 1A illustrate a control circuit 100 for a flyback circuit in accordance with an embodiment of the present invention. The flyback circuit converts an input voltage Vin to an output voltage Vout, and comprises a transformer T1 having a primary winding Lp, a secondary winding Ls and an auxiliary winding Laux. Both of the secondary winding Ls and the auxiliary winding Laux have an opposite dot orientation with the primary winding Lp. An excitation current $I_{Lm}$ flows through an magnetic inductance Lm (shown in dashed lines) of the transformer T1, and the excitation current $I_{Lm}$ is defined as positive when it flows into the transformer T1. The primary winding Lp is coupled in series to primary switch Mp between the input voltage Vin and a primary ground reference PGND. The auxiliary winding Laux is configured to provide a DC voltage VDD to a chip IC1 for power supply.

In the example of FIG. 1A, the control circuit 100 comprises: an auxiliary switch Maux, coupled to the auxiliary winding Laux; a first control unit 101, receiving an auxiliary switch voltage signal Vds_aux, and providing a first control signal Saux to control switching-on of the auxiliary switch Maux; a second control unit 102, receiving the auxiliary switch current signal Ids_aux and providing a second control signal Raux to control switching-off of the auxiliary switch Maux; a third control unit 103, receiving the auxiliary switch voltage signal Vds_aux and the auxiliary switching signal Gaux, and providing a third control signal Sp to control switching-on of the primary switch Mp; a logic circuit 104, receiving the first control signal Saux, the second control signal Raux, the third control signal Sp, and a fourth control signal Rp, and providing the auxiliary switching signal Gaux and a primary switching signal Gp. The auxiliary switch voltage signal Vds_aux is indicative of a voltage across the auxiliary switch Maux, and the auxiliary switch current signal Ids_aux is indicative of a current IMaux flowing through the auxiliary switch Maux. Since the branch of the auxiliary winding Laux and the auxiliary switch Maux is in parallel with a capacitor C3, the current IMaux will charge or discharge the capacitor C3 depending on the direction of the current IMaux. In the example of FIG. 1, the auxiliary switch current signal Ids_aux is defined as positive when the current Maux discharges the capacitor C3.

In FIG. 1A, the auxiliary switch Maux is integrated into the chip IC1. In another embodiment of the present invention, the auxiliary switch Maux may be a discrete component standalone from the chip IC1. In another embodiment of the present invention, the auxiliary switch Maux may comprise a plurality of switching devices (e.g. MOSFETs) in series or in parallel.

Figure 1B:
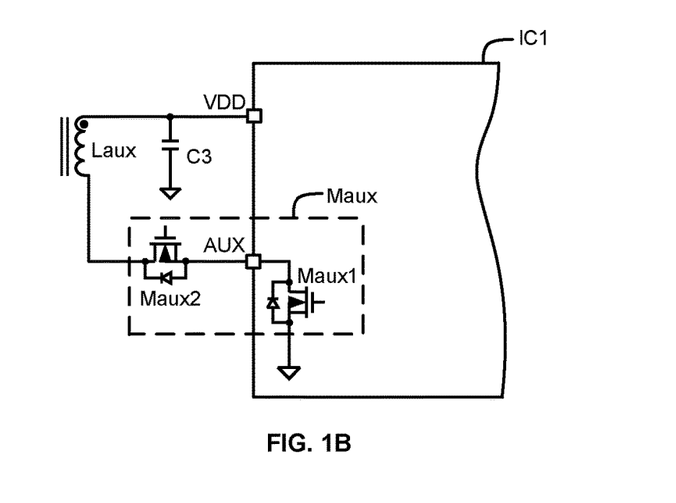
FIG. 1B shows a structure of the auxiliary switch Maux in accordance with an embodiment of the present invention.

FIG. 1B shows a structure of the auxiliary switch Maux in accordance with an embodiment of the present invention. In the example of FIG. 1B, the auxiliary switch Maux may comprise a first auxiliary switch Maux1 and a second auxiliary switch Maux2 coupled in series, wherein the first auxiliary switch Maux1 is integrated into the chip IC1, and the second auxiliary switch Maux2 is discrete and standalone from the chip IC1. Thus, the voltage stress of the first auxiliary switch Maux1, which is integrated and co-works with other parts of the chip IC1, is lower than in a case where there exists only the first auxiliary switch Maux1, so the chip IC1 may be applied to wider input voltage range. In addition, the voltage stress of the second auxiliary switch Maux2 is also relieved, so a switching device with lower voltage rating may be adopted as the second auxiliary switch Maux2 for a purpose of costing down.

Figure 2:
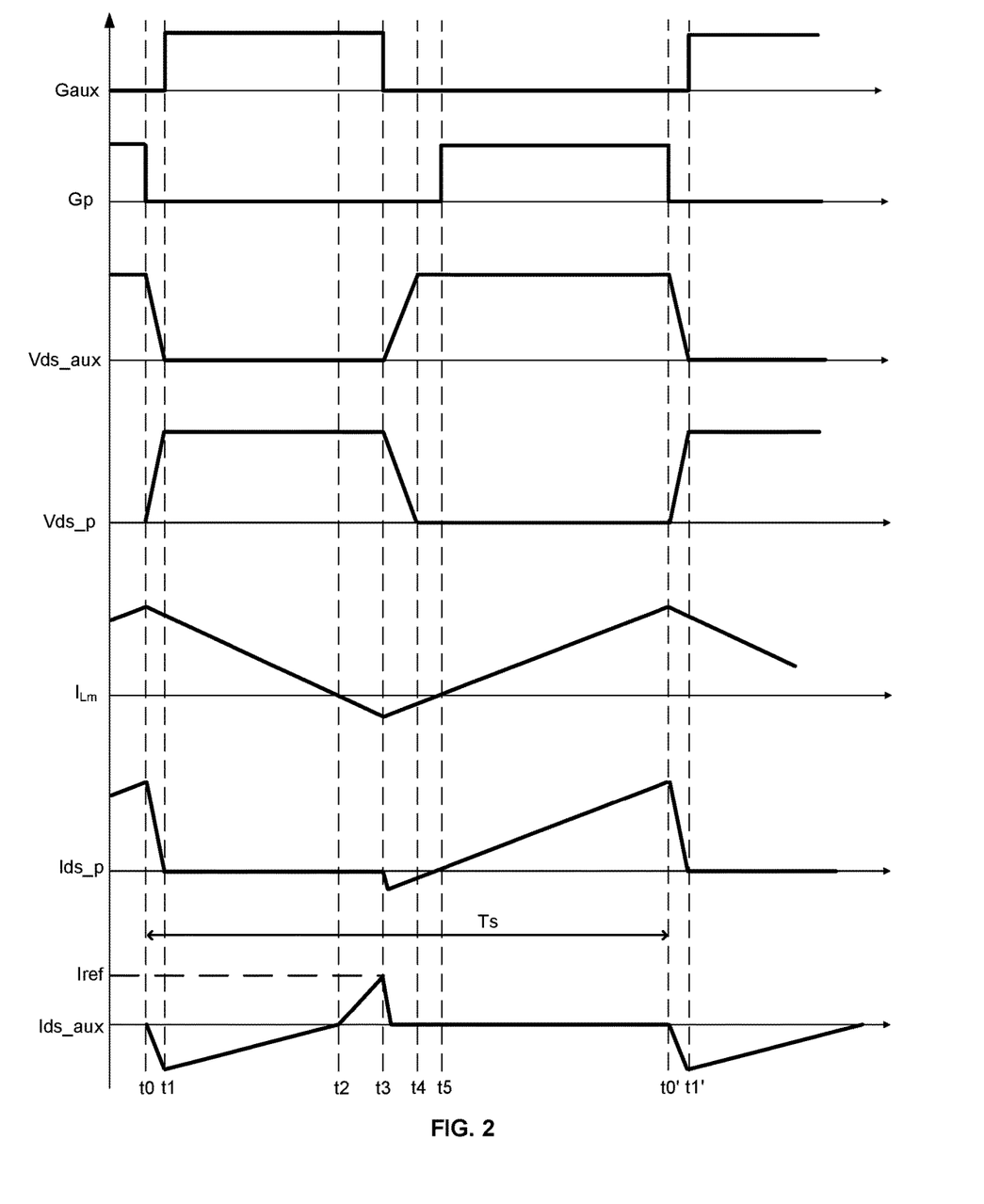
FIG. 2 shows the waveforms of signals in FIG. 1A under BCM.

In the present invention, the flyback circuit is controlled to be operated under BCM (Boundary Conduction Mode) or DCM (Discontinuous Conduction Mode) depending on a load RL. When the load RL is heavy, the flyback circuit is operated under BCM. As the load RL decreases, the switching frequency of the flyback circuit increases. When the switching frequency increases to a frequency threshold, the flyback circuit will be operated under DCM. FIG. 2 shows the waveforms of signals in FIG. 1A under BCM, while FIG. 3 shows the waveforms of signals in FIG. 1A under DCM.

As shown in FIG. 2, at the time t0, the primary switch Mp is turned off by the primary switching signal Gp. In response to that, the auxiliary winding Laux generates a voltage and the current $I_{Maux}$ begins to charge the capacitor C3. The auxiliary switch current signal Ids_aux turns negative accordingly. During the time period t0-t1, the auxiliary switch voltage signal Vds_aux decreases while a primary switch voltage signal Vds_p indicative of the voltage across the primary switch Mp increases. At the time t1, the auxiliary switch voltage signal Vds_aux decreases to zero, and the auxiliary switch Maux is turned on by the auxiliary switching signal Gaux, meaning that ZVS on of the auxiliary switch Maux is achieved. During the time period t1-t2, the excitation current $I_{Lm}$ as well as the auxiliary switch current signal Ids_aux decreases, due to that energy stored in the magnetic inductance Lm is transferred to the load RL and to the chip IC1. At the time t2, both of the excitation current $I_{Lm}$ and the auxiliary switch current signal Ids_aux decreases to zero, however the auxiliary switch Maux continues to be in on-state. During the time period t2-t3, the auxiliary switch current signal Ids_aux increases from zero, as the current $I_{Maux}$ changes its direction and increases. This is reflected to the primary winding Lp, thus the excitation current $I_{Lm}$ turns to be negative. At the time t3, the auxiliary switch current signal Ids_aux increases to a current level of a reference current Iref. Accordingly, the auxiliary switch Maux is turned off by the auxiliary switching signal Gaux. Meanwhile, since the excitation current $I_{Lm}$ is negative, it begins to discharge the output capacitor of the primary switch Mp. During the time period t3-t4, the primary switch voltage signal Vds_p decreases while the auxiliary switch voltage signal Vds_aux increases. At the time t4, the primary switch voltage signal Vds_p decreases to zero. At the time t5, the primary switch Mp is turned on by the primary switching signal Gp, meaning that the ZVS on of the primary switch Mp is achieved. Persons of ordinary skills in the art should know, the primary switch Mp may be turned on at any time after the time t4. In the example of FIG. 2, a switching period Ts of a switching cycle is from the time t0 to the time t0'. Obviously, the length of the time period t1-t1' also equals the switching period Ts.

Figure 3:
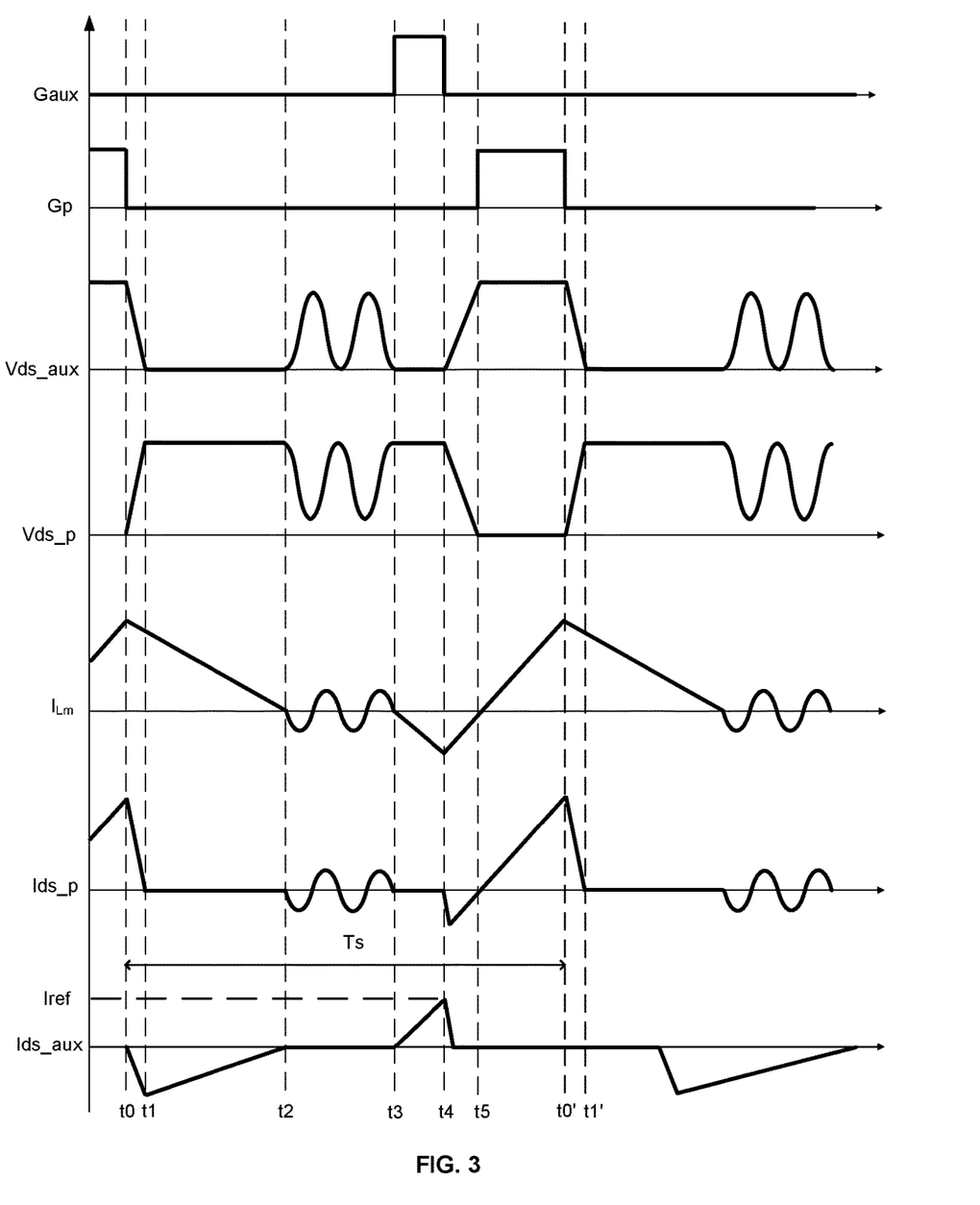
FIG. 3 shows the waveforms of signals in FIG. 1A under DCM.

FIG. 3 shows the waveforms of signals in FIG. 1 under DCM. In FIG. 3, the change of the waveforms during the time periods t0-t1 and t1-t2 are similar with that of FIG. 2. After the time t2, since the excitation current $I_{Lm}$ decreases to zero, and the auxiliary switch Maux is still in off-state, oscillation occurs in the voltage and current waveforms of the primary switch Mp and the auxiliary switch Maux, which is shown in FIG. 3. The auxiliary switch Maux will be turned on when, after elapse of a predetermined waiting time counted from a predetermined moment in an immediate preceding switching cycle, the auxiliary switch voltage signal Vds_aux decreases to a valley, which will be described in detail in FIG. 5. A valley of a voltage signal, as persons of ordinary skills in the art should know, indicates an extremum value that is locally minimal, of the voltage signal. In the example of FIG. 3, after the time t2, the auxiliary switch Maux is turned on at the time t3, meaning that ZVS on of the auxiliary switch Maux is achieved. After the time t3, the changes of waveforms are similar with that of FIG. 2, so a detailed description is omitted here for brevity. At the time t5, the primary switch voltage signal Vds_p decreases to zero, and the primary switch Mp is turned on by the primary switching signal Gp, meaning that the ZVS on of the primary switch Mp is achieved. Obviously, the primary switch Mp may be turned on at any time after the time t5. In the example of FIG. 3, a switching period Ts of a switching cycle is from the time t0 to the time t0'.

Figure 4A:
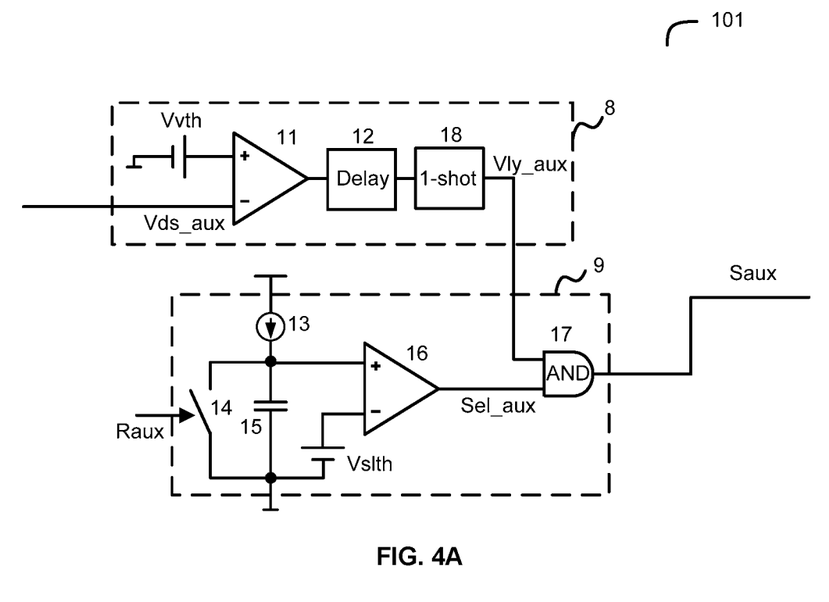
FIG. 4A schematically shows the first control unit 101 in accordance with an embodiment of the present invention.

FIG. 4A schematically shows the first control unit 101 in accordance with an embodiment of the present invention. The first control unit 101 is configured to provide the first control signal Saux to control switching-on of the auxiliary switch Maux, comprising a valley timing detector 8 and a valley timing selector 9. The valley timing detector 8 is configured to detect timings of the valleys of the auxiliary switch voltage signal Vds_aux, comprising a comparator 11, a delay circuit 12 and a 1-shot circuit 18. The comparator 11 has an inverting input terminal receiving the auxiliary switch voltage signal Vds_aux, a non-inverting input terminal receiving a first threshold voltage Vvth, and an output terminal providing a comparison signal. After being delayed for certain time in the delay circuit 12, the rising edge of the comparison signal triggers the 1-shot circuit 18, which generates a first pulse sequence Vly_aux indicative of timings when the auxiliary switch voltage signal Vds_aux decreases to a valley.

The valley timing selector 9 is configured to generate the first control signal Saux, comprising a current source 13, a switch 14, a capacitor 15, a comparator 16 and an AND gate. As shown in FIG. 4A, the switch 14 is controlled by the second control signal Raux. In some embodiments of the present invention, the second control signal Raux is a 1-shot signal, and when the second control signal Raux shoots to high level, i.e. when the auxiliary switch Maux is turned off, the switch 14 is turned on and the capacitor 15 is instantly discharged. Then the capacitor 15 is charged again gradually by the current source 13, and when the voltage across the capacitor 15 reaches a second threshold voltage Vslth, an indicating signal Sel_aux provided by the comparator 16 rises to high level. The first control signal Saux is provided by the AND gate 17, based on the first pulse sequence Vly_aux and the indicating signal Sel_aux. That is, the valley timing selector 9 begins counting a predetermined waiting time from a predetermined moment when the auxiliary switch Maux is turned off in an immediate preceding switching cycle. Obviously, the length of the predetermined waiting time is related to a current provided by the current source 13, a capacitance of the capacitor 15 and a value of the second threshold voltage Vslth.

Figure 4B:
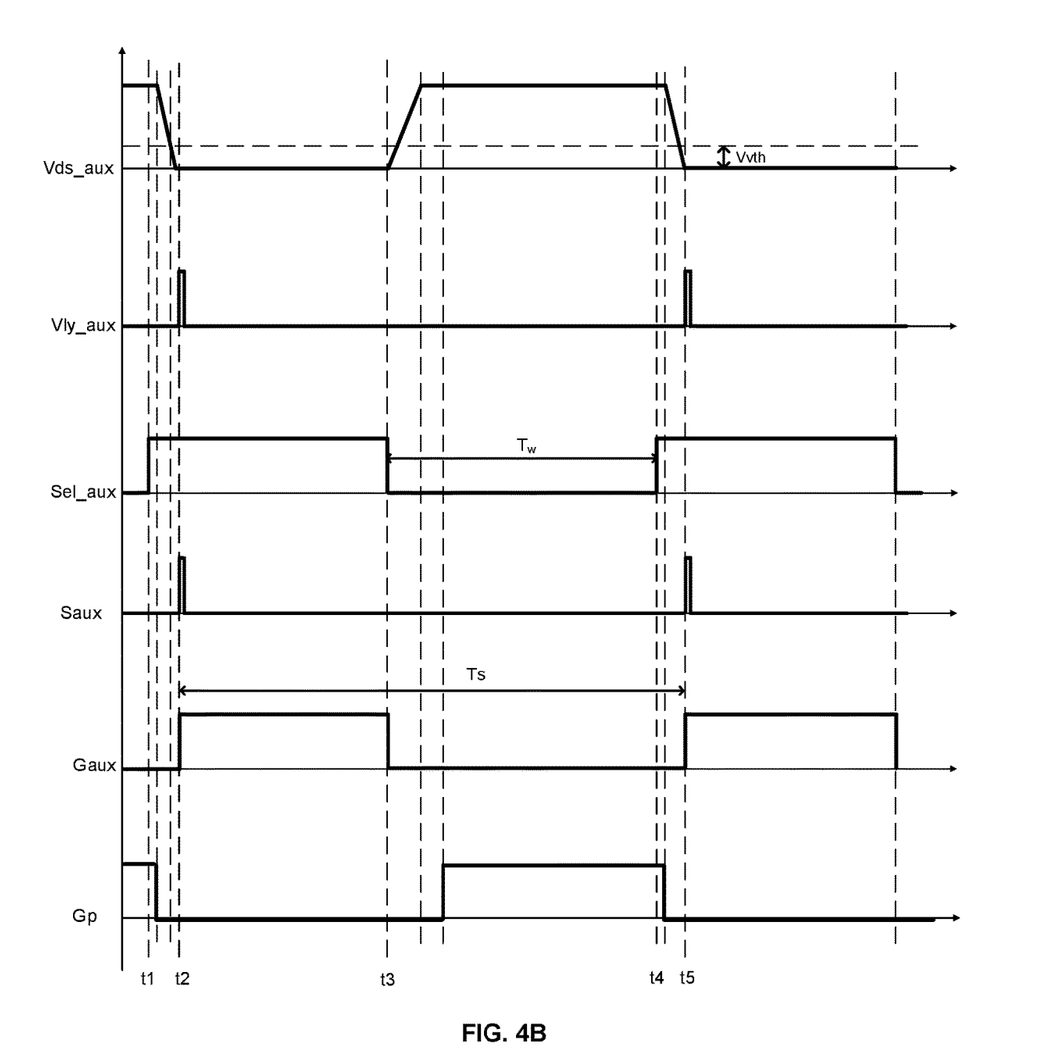
FIG. 4B shows the waveforms of the signals of the first control unit 101 in FIG. 4A under BCM.

FIG. 4B shows the waveforms of the signals of the first control unit 101 in FIG. 4A under BCM. At the time t1, the indicating signal Sel_aux rises to high level when a predetermined waiting time Tw have elapsed. At the time t2, the auxiliary switch voltage signal Vds_aux decreases to a valley as detected by the valley timing detector 8, a pulse is generated in the first pulse sequence Vly_aux. So, at the time t2, the first control signal Saux is provided based on the first pulse sequence Vly_aux and the indicating signal Sel_aux. At the time t3, the auxiliary switch Maux is turned off, meanwhile the capacitor 15 is fast discharged and then charged gradually. At the time t4, the voltage across the capacitor 15 increases to the value of the second threshold voltage Vslth, and the indicating signal Sel_aux rises to high level again. Namely, the length of the time period t3-t4, is the predetermined waiting time Tw. Persons of ordinary skills in the art should know that the time period t2-t5 is a switching cycle with the switching period Ts. In another word, the predetermined waiting time Tw is counted from a predetermined moment when the auxiliary switch Maux is turned off in an immediate preceding switching cycle, and the auxiliary switch Maux is turned on in the current switching cycle when, after elapse of the predetermined waiting time Tw, the auxiliary switch voltage signal Vds_aux decreases to a valley.

Figure 4C:
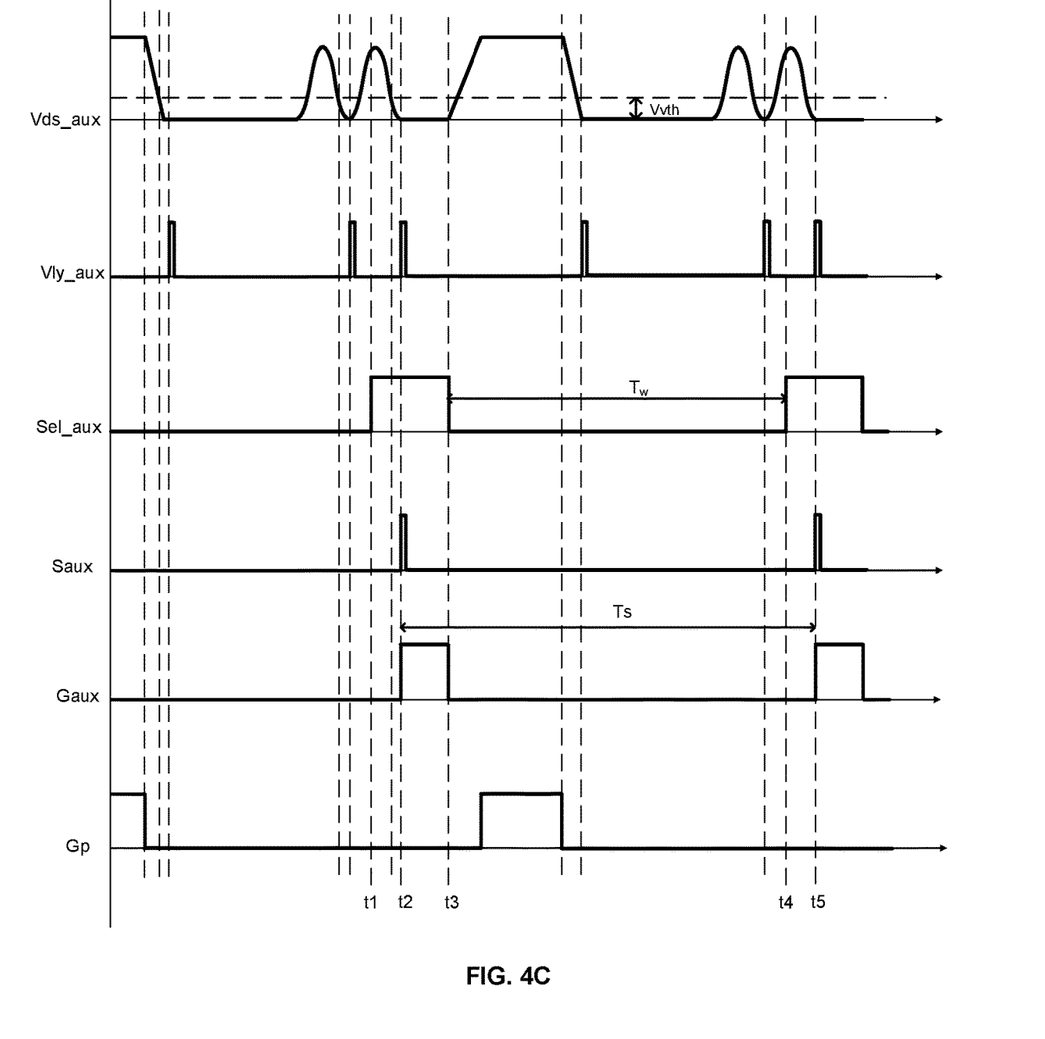
FIG. 4C shows the waveforms of the signals of the first control unit 101 in FIG. 4A under DCM.

FIG. 4C shows the waveforms of the signals of the first control unit 101 in FIG. 4A under DCM. In the example of FIG. 4C, the time period t2-t5 is a switching cycle with the switching period Ts. The predetermined waiting time Tw is configured such that the auxiliary switch Maux is turned on at the time t5, which is a timing of the second valley of the auxiliary switch voltage signal Vds_aux during oscillation for the next switching cycle. Of course, the predetermined waiting time Tw may be configured such that the auxiliary switch Maux is turned on at a timing of the first, or the third, or the fourth . . . valley of the auxiliary switch voltage signal Vds_aux during oscillation according to different load conditions. In an embodiment of the present invention, when the load is heavier than a critical load (eg. 50% of the full load), the flyback circuit is operated under BCM and the switching frequency is lower than a frequency threshold, then the predetermined waiting time is fixed; as the load decreases to be lighter than the critical load, the flyback circuit is operated under DCM and the switching frequency increases above the frequency threshold, then the predetermined waiting time is prolonged. In an embodiment of the present invention, the predetermined waiting time is longer as the load is lighter.

Figure 4D:
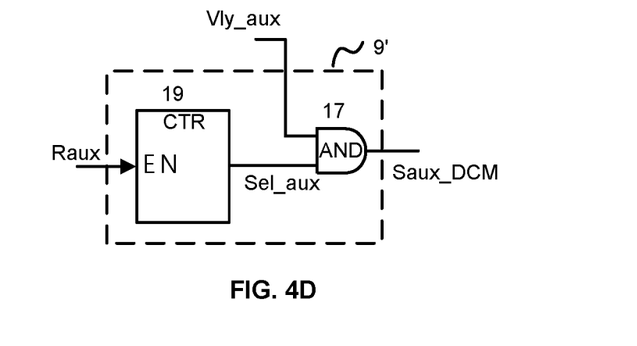
FIG. 4D schematically shows a valley timing selector 9' in accordance with an embodiment of the present invention.

Persons of ordinary skills in the art should know that, the valley timing detector 8 and the valley timing selector 9 may be implemented in other forms of circuits. FIG. 4D schematically shows a valley timing selector 9' in accordance with an embodiment of the present invention. The valley timing selector 9' comprises a counter 19 and the AND gate 17. The counter 19 has an enable terminal EN receiving the second control signal Raux, and an output terminal providing the indicating signal Sel_aux. The counter 19 is configured to begin counting the predetermined waiting time Tw when the second control signal Raux shoots to high level, and to generate the indicating signal Sel_aux when the predetermined waiting time Tw elapses.

In some other embodiments of the present invention, the predetermined waiting time Tw is counted from a predetermined moment when the primary switch Mp is turned on in an immediate preceding switching cycle. Accordingly, the valley timing selector 9 may be configured to receive the third control signal Sp instead of the second control signal Raux.

Figure 5:
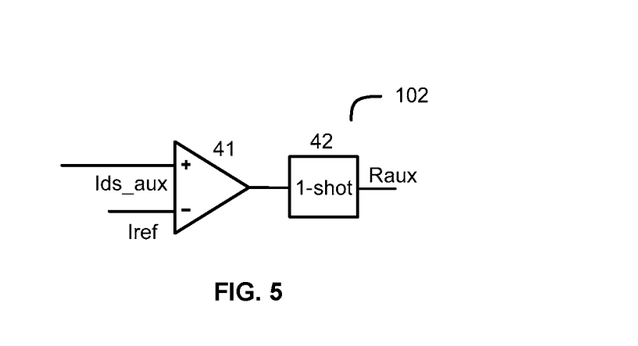
FIG. 5 schematically shows the second control unit 102 in accordance with an embodiment of the present invention.

FIG. 5 schematically shows the second control unit 102 in accordance with an embodiment of the present invention. The second control unit 102 is configured to control switching-off of the auxiliary switch Maux, comprising a comparator 41 and a 1-shot circuit 42. The comparator 41 has an inverting input terminal receiving a reference current Iref, a non-inverting input terminal receiving the auxiliary switch current signal Ids_aux and an output terminal. The 1-shot circuit 42 is coupled to the output terminal of the comparator and configured to provide the second control signal Raux. In another embodiment of the present invention, the 1-shot circuit 42 may be omitted.

Figure 6:
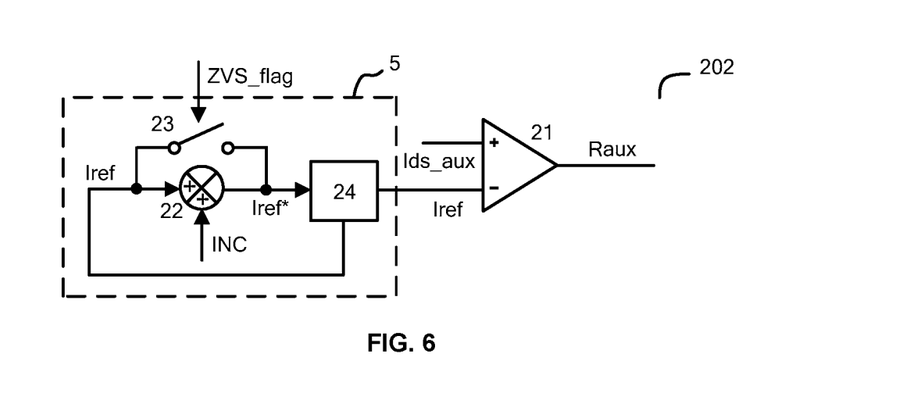
FIG. 6 schematically shows a second control unit 202 in accordance with the present invention.

FIG. 6 schematically shows a second control unit 202 in accordance with the present invention. In the example of FIG. 6, the reference current Iref is adjustable based on whether the ZVS-on of the primary switch Mp is achieved. The second control unit 202 comprises a comparator 21 and a ZVS regulating circuit 5. The ZVS regulating circuit 5 comprises an adder 22, a control switch 23 and a register 24. The adder 22 is configured to receive the reference current Iref and a step value INC, and to generate a newly updated reference current Iref* as the sum of the reference current Iref and the step value INC. The register 24 is configured to receive the newly updated reference current Iref* and to provided it as the reference current Iref to the comparator 21. The control switch 23 is paralleled with the adder 22, and is configured to be controlled on and off by a ZVS flag signal ZVS_flag. The ZVS flag signal ZVS_flag indicates whether ZVS-on of the primary switch Mp is achieved. In the example of FIG. 6, if ZVS-on of the primary switch Mp is not achieved, the ZVS flag signal ZVS_flag is at low level, so the control switch 24 is in off-state, then the reference current Iref is added with the step value INC to generate the newly updated reference current Iref* for the next switching cycle. If ZVS-on of the primary switch Mp is achieved, the ZVS flag signal ZVS_flag rises to high level and turns on the control switch 24 to short circuit the adder 22, thus the current level of the reference current Iref will be maintained and not increased further.

Figure 7:
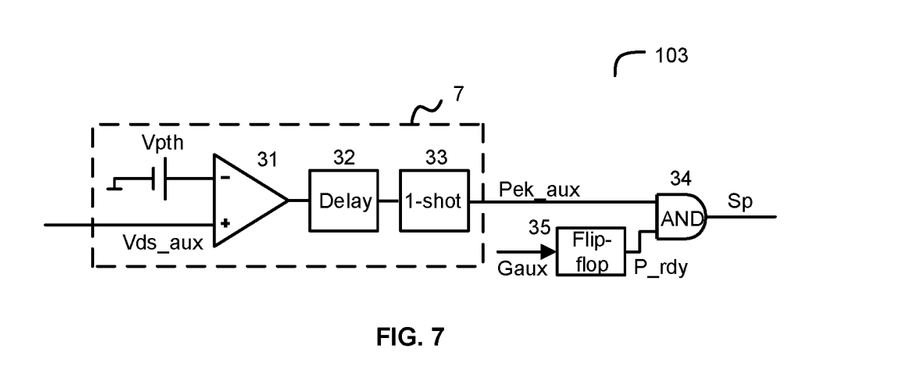
FIG. 7 schematically shows the third control unit 103 in accordance with an embodiment of the present invention.

FIG. 7 schematically shows the third control unit 103 in accordance with an embodiment of the present invention. The third control unit 103 is configured to control switching on of the primary switch Mp, comprising a peak timing detector 7, a flip-flop 35 and an AND gate 34. The peak timing detector 7 is configured to detect timings of the peaks of the auxiliary switch voltage signal Vds_aux. As persons of ordinary skills in the art should know, a peak of a voltage signal indicates an extremum value that is locally maximal, of the voltage signal. Since the structure of the peak timing detector 7 is similar with that of the valley timing detector 8, the description of the peak timing detector 7 is omitted here for brevity. As can be se seen from FIG. 2 or FIG. 3, when the auxiliary switch voltage signal Vds_aux increases to a peak, the primary switch voltage signal Vds_p decreases to a valley. Accordingly, the peak timing detector 7 actually detects timings for the valleys of the primary switch voltage signal Vds_p. The peak timing detector 7 provides a second pulse sequence Pek_aux indicative of timings when the auxiliary switch voltage signal Vds_aux increases to the peaks. The flip-flop 35 receives the auxiliary switching signal Gaux and generates a primary ready signal P_rdy based on the falling edge of the auxiliary switching signal Gaux. The primary ready signal P_rdy indicates that the primary switch Mp is ready to be turned on. The AND gate 34 receives the second pulse sequence Pek_aux and the primary ready signal P_rdy provided by the flip-flop 35, and provides the third control signal Sp.

Figure 8:
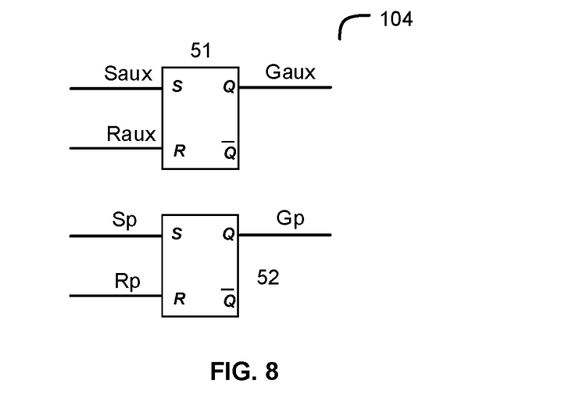
FIG. 8 schematically shows the logic circuit 104 in accordance with an embodiment of the present invention.

FIG. 8 schematically shows the logic circuit 104 in accordance with an embodiment of the present invention. The logic circuit 104 is configured to provide the auxiliary switching signal Gaux and the primary switching signal based on the first control signal Saux, the second control signal Raux, the third control signal Sp and the fourth control signal Rp, comprising a first RS latch 51 and a second RS latch 52. The first RS latch 51 has a reset terminal "R" receiving the second control signal Raux, a set terminal "S" receiving the first control signal Saux, and an output terminal providing the auxiliary switching signal Gaux. The second RS latch 52 has a reset terminal "R" receiving the fourth control signal Rp, a set terminal "S" receiving the third control signal Sp, and an output terminal providing the primary switching signal Gp.

Figure 9:
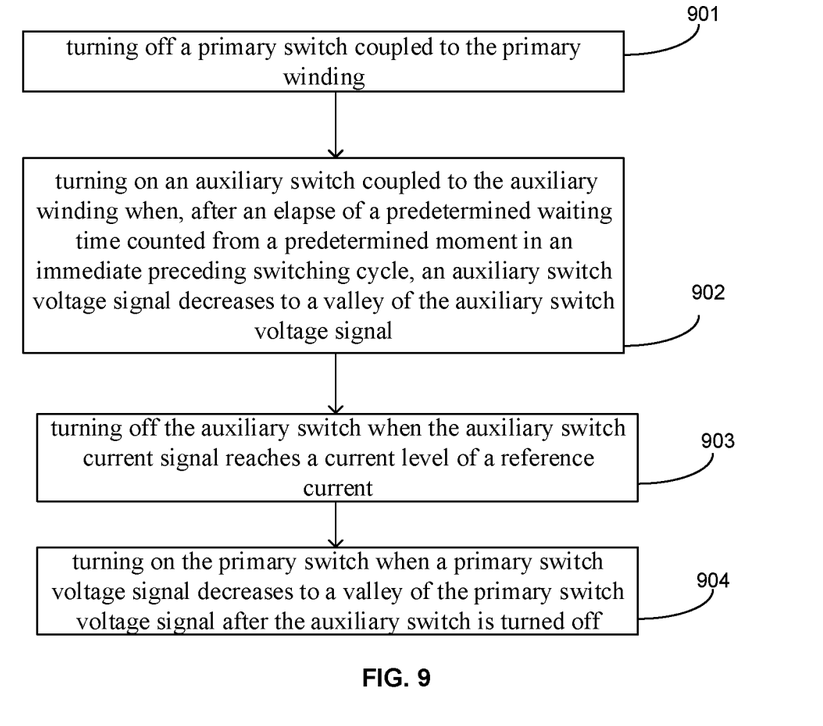
FIG. 9 illustrates a flow chart of a method of controlling a flyback circuit in accordance with an embodiment of the present invention.

FIG. 9 illustrates a flow chart of a method of controlling a flyback circuit in accordance with an embodiment of the present invention. The flyback circuit comprises a transformer having a primary winding and an auxiliary winding having an opposite dot orientation with the primary winding. The method comprises in each of successive switching cycles:

Step 901, turning off a primary switch coupled to the primary winding;

Step 902, turning on an auxiliary switch coupled to the auxiliary winding when, after elapse of a predetermined waiting time counted from a predetermined moment in an immediate preceding switching cycle, an auxiliary switch voltage signal decreases to a valley of the auxiliary switch voltage signal;

Step 903, turning off the auxiliary switch when the auxiliary switch current signal increases to a current level of a reference current; and Step 904, turning on the primary switch when a primary switch voltage signal decreases to a valley of the primary switch voltage signal after the auxiliary switch is turned off.

In an embodiment of the present invention, the predetermined moment in the immediate preceding switching cycle is a moment when the auxiliary switch is turned off in the immediate preceding switching cycle.

In another embodiment of the present invention, the predetermined moment in the immediate preceding switching cycle is a moment when the primary switch is turned on in the immediate preceding switching cycle.

In an embodiment of the present invention, the step of turning on the primary switch comprises detecting a peak of the auxiliary switch voltage signal after the auxiliary switch is turned off.

In an embodiment of the present invention, the reference current is adjustable. The reference current increases by a step value in each switching cycle until ZVS on of the primary switch is achieved.

While specific embodiments of the present invention have been provided, it is to be understood that these embodiments are for illustration purposes and not limiting. Since the invention can be practiced in various forms without distracting the spirit or the substance of the invention, it should be understood that the above embodiments are not confined to any aforementioned specific detail, but should be explanatory broadly within the spirit and scope limited by the appended claims. Thus, all the variations and modification falling into the scope of the claims and their equivalents should be covered by the appended claims.

What is claimed is:

1. A method of controlling a flyback circuit during a switching cycle, wherein the flyback circuit has a transformer having a primary winding and an auxiliary winding, the primary winding and the auxiliary winding have opposite dot orientations with each other, the method comprising:
turning off a primary switch coupled to the primary winding;
turning on an auxiliary switch coupled to the auxiliary winding at a moment when, after an elapse of a predetermined waiting time counted from a predetermined moment in an immediate preceding switching cycle, an auxiliary switch voltage signal decreases to a valley of the auxiliary switch voltage signal;
turning off the auxiliary switch at a moment when an auxiliary switch current signal increases to a current level of a reference current; and
turning on the primary switch at a moment when a primary switch voltage signal decreases to a valley of the primary switch voltage signal after the auxiliary switch is turned off.

2. The method of claim 1, wherein, the predetermined moment in the immediate preceding switching cycle is a moment when the auxiliary switch is turned off in the immediate preceding switching cycle.

3. The method of claim 1, wherein, the predetermined moment in the immediate preceding switching cycle is a moment when the primary switch is turned on in the immediate preceding switching cycle.

4. The method of claim 1, wherein, in the step of turning on the primary switch, the moment when the primary switch voltage signal decreases to the valley of the primary switch voltage signal is captured by detecting a peak of the auxiliary switch voltage signal.

5. The method of claim 1, further comprises:
checking if ZVS-on of the primary switch is achieved;
increasing the current level of the reference current by a step value if ZVS-on of the primary switch is not achieved; and
maintaining the current level of the reference current if ZVS-on of the primary switch is achieved.

6. The method of claim 1, wherein, the predetermined waiting time is adjusted depending on a load condition.

7. A control circuit for a flyback circuit, wherein the flyback circuit has a transformer having a primary winding and an auxiliary winding, and a primary switch coupled to the primary winding, the primary winding and the auxiliary winding having opposite dot orientations with each other, the control circuit comprising:
an auxiliary switch, coupled to the auxiliary winding;
a first control unit, configured to provide a first control signal to control turning-on of the auxiliary switch, wherein, the auxiliary switch is turned on when, after an elapse of a predetermined waiting time counted from a predetermined moment in an immediate switching cycle, an auxiliary switch voltage signal decreases to a valley of the auxiliary switch voltage signal;
a second control unit, configured to provide a second control signal to control turning-off of the auxiliary switch, wherein the auxiliary switch is turned off when the auxiliary switch current signal increases to a current level of a reference current;
a third control unit, configured to provide a third control signal to control turning-on of the primary switch, wherein the primary switch is turned on when a primary switch voltage signal decreases to a valley of the primary switch voltage signal; and
a logic circuit, configured to provide a primary switching signal based on the third control signal and a fourth control signal and an auxiliary switching signal based on the first control signal and the second control signal, wherein the primary switch is controlled by the primary switching signal, and the auxiliary switch is controlled by the auxiliary switching signal.

8. The control circuit of claim 7, wherein the auxiliary switch is integrated into a common chip with the first control unit, the second control unit, the third control unit and the logic circuit.

9. The control circuit of claim 7, wherein the auxiliary switch comprises a first auxiliary switch and a second auxiliary switch coupled in series to each other, wherein the first auxiliary switch is integrated into a common chip with the first control unit, the second control unit, the third control unit and the logic circuit, and the second auxiliary switch is standalone from the chip.

10. The control circuit of claim 7, wherein the first control unit comprises:
a valley timing detector, configured to receive the auxiliary switch voltage signal and to generate a first pulse sequence indicative of timings when the auxiliary switch voltage signal decreases to a valley of the auxiliary switch voltage signal; and
a valley timing selector, configured to generate an indicating signal indicative of a timing when the predetermined waiting time elapses, and to generate the first control signal based on the indicating signal and the first pulse sequence.

11. The control circuit of claim 10, wherein the valley timing selector comprises:
a timer, configured to begin counting the predetermined waiting time from the predetermined moment in the immediate preceding switching cycle, and to generate the indicating signal when the predetermined waiting time elapses; and
a AND gate, configured to receive the indicating signal and the first pulse sequence and to generate the first control signal.

12. The control circuit of claim 7, wherein the second control unit comprises:
a comparator, configured to receive the auxiliary switch current signal and the reference current, and to generate the second control signal based on the comparison between the auxiliary switch current signal and the reference current.

13. The control circuit of claim 12, wherein the second control unit further comprises a ZVS regulating circuit, the ZVS regulating circuit comprising:
an adder, configured to receive the reference current and a step value, and to generate a newly updated reference current;
a register, configured to receive the newly updated reference current and to provide it as the reference current to the comparator; and
a control switch, configured to be paralleled with the adder, and to be controlled on and off by a ZVS flag signal, wherein the ZVS flag signal indicates whether ZVS-on of the primary switch is achieved.

14. The control circuit of claim 7, wherein the third control unit comprises:
- a peak timing detector, configured to receive the auxiliary switch voltage signal and to generate a second pulse sequence indicative of a timing when the auxiliary switch voltage signal increases to a peak;
- a flip-flop, configured to receive the auxiliary switching signal and to generate a primary ready signal based on a falling edge of the auxiliary switching signal; and
- an AND gate, configured to generate the third control signal based on the second pulse sequence and the primary ready signal.

15. The control circuit of claim 7, wherein the logic circuit comprises:
- a first RS latch, configured to receive the first control signal at a set terminal and the second control signal at a reset terminal, and to generate the auxiliary switching signal; and
- a second RS latch, configured to receive the third control signal at a set terminal and the fourth control signal at a reset terminal, and to generate to primary switching signal.

16. An isolation voltage converter, comprising:
- a flyback circuit, comprising a transformer having a primary winding and an auxiliary winding, and a primary switch coupled to the primary winding, wherein the primary winding and the auxiliary winding have opposite dot orientations with each other; and
- a control circuit, comprising:
- an auxiliary switch, coupled to the auxiliary winding;
- a first control unit, configured to provide a first control signal to control turning-on of the auxiliary switch, wherein, the auxiliary switch is turned on when, after elapse of a predetermined waiting time counted from a predetermined moment in an immediate preceding switching cycle, an auxiliary switch voltage signal decreases to a valley of the auxiliary switch voltage signal;
- a second control unit, configured to provide a second control signal to control turning-off of the auxiliary switch, wherein the auxiliary switch is turned off when the auxiliary switch current signal increases to a current level of a reference current;
- a third control unit, configured to provide a third control signal to control turning-on of the primary switch, wherein the primary switch is turned on when a primary switch voltage signal decreases to a valley of the primary switch voltage signal; and
- a logic circuit, configured to provide a primary switching signal based on the third control signal and a fourth control signal and an auxiliary switching signal based on the first control signal and the second control signal, wherein the primary switch is controlled by the primary switching signal, and the auxiliary switch is controlled by the auxiliary switching signal.

17. The isolation voltage converter of claim 16, wherein the auxiliary switch is integrated into a common chip with the first control unit, the second control unit, the third control unit and the logic circuit.

18. The isolation voltage converter of claim 16, wherein the auxiliary switch comprises a first auxiliary switch and a second auxiliary switch coupled in series to each other, wherein the first auxiliary switch is integrated into a common chip with the first control unit, the second control unit, the third control unit and the logic circuit, and the second auxiliary switch is standalone from the chip.

19. The isolation voltage converter of claim 16, wherein the first control unit comprises:
- a valley timing detector, configured to receive the auxiliary switch voltage signal and to generate a first pulse sequence indicative of timings when the auxiliary switch voltage signal decreases to a valley of the auxiliary switch voltage signal; and
- a valley timing selector, configured to generate an indicating signal indicative of a timing when the waiting time elapses, and to generate the first control signal based on the indicating signal and the first pulse sequence.

20. The control circuit of claim 16, wherein the valley timing selector comprises:
- a timer, configured to begin counting the predetermined waiting time from the predetermined moment in the immediate preceding switching cycle, and to generate the indicating signal when the predetermined waiting time elapses; and
- a AND gate, configured to receive the indicating signal and the first pulse sequence and to generate the first control signal.

* * * * *